United States Patent
Herr et al.

(10) Patent No.: US 9,348,194 B2
(45) Date of Patent: May 24, 2016

(54) GENERATING OPTICAL PULSES VIA A SOLITON STATE OF AN OPTICAL MICRORESONATOR

(71) Applicant: Ecole Polytechnique Federale de Lausanne (EPFL), Lausanne (CH)

(72) Inventors: Tobias Herr, Morges (CH); Michael L. Gorodetsky, Moscow (RU); Tobias Kippenberg, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 14/770,541

(22) PCT Filed: Feb. 28, 2013

(86) PCT No.: PCT/EP2013/000591
§ 371 (c)(1),
(2) Date: Aug. 26, 2015

(87) PCT Pub. No.: WO2014/131425
PCT Pub. Date: Sep. 4, 2014

(65) Prior Publication Data
US 2016/0011489 A1    Jan. 14, 2016

(51) Int. Cl.
*G02F 1/035* (2006.01)
*G02F 1/35* (2006.01)
(Continued)

(52) U.S. Cl.
CPC .......... *G02F 1/3513* (2013.01); *G02B 6/29338* (2013.01); *G02F 1/3536* (2013.01);
(Continued)

(58) Field of Classification Search
CPC ..... G02F 1/3551; G02F 1/3536; G02F 1/365; H01S 3/002
See application file for complete search history.

(56) References Cited

U.S. PATENT DOCUMENTS

2006/0051100 A1* 3/2006 Watanabe ........ H04B 10/07953
398/152
2010/0271928 A1* 10/2010 Yamazoe ............... B82Y 10/00
369/122
(Continued)

FOREIGN PATENT DOCUMENTS

EP          1988425 A1    11/2008

OTHER PUBLICATIONS
International Search Report for PCT/EP2013/000591 (Nov. 29, 2013).
(Continued)

*Primary Examiner* — Michelle R Connelly
*Assistant Examiner* — Hoang Tran
(74) *Attorney, Agent, or Firm* — Caesar Rivise, PC

(57) ABSTRACT

A light pulse source (100), being adapted for generating repetitive optical pulses, comprises a continuous wave (cw) laser (10) being arranged for providing cw laser light, an optical microresonator (20) being made of a resonator material, which has a third order (Kerr) nonlinearity and an anomalous resonator dispersion, wherein the cw laser (10) is arranged for coupling the cw laser light into the optical microresonator (20), which, at a predetermined relative detuning of the cw laser (10) and the optical microresonator (20), is capable of including a light field in a soliton state, wherein soliton shaped pulses can be coupled out of the optical microresonator (20) for providing the repetitive optical pulses, and a tuning device (30) being arranged for creating and maintaining the predetermined relative detuning of the cw laser (10) and the optical microresonator (20) based on a tuning time profile being selected in dependency on a thermal time constant of the optical microresonator (20) such that the soliton state is achieved in a thermal equilibrium state of the optical microresonator (20). Furthermore, a method of generating repetitive optical pulses is described based on soliton shaped pulses coupled out of an optical microresonator (20) is described.

30 Claims, 3 Drawing Sheets

(51) Int. Cl.
  *G02F 1/365* (2006.01)
  *G02B 6/293* (2006.01)
  *G02F 1/355* (2006.01)
  *H01S 3/00* (2006.01)

(52) U.S. Cl.
  CPC ............... *G02F 1/3551* (2013.01); *G02F 1/365* (2013.01); *H01S 3/0092* (2013.01); *G02F 2203/15* (2013.01); *G02F 2203/17* (2013.01); *G02F 2203/56* (2013.01)

(56) References Cited

U.S. PATENT DOCUMENTS

| | | | | |
|---|---|---|---|---|
| 2011/0013653 A1* | 1/2011 | Krausz | .................. | G02F 1/3501 372/22 |
| 2013/0032581 A1* | 2/2013 | Kusukame | ........... | B23K 26/063 219/121.6 |
| 2014/0247448 A1* | 9/2014 | Wise | ...................... | G01N 21/65 356/301 |

OTHER PUBLICATIONS

Carmon et al, "Dynamical thermal behavior and thermal self-stability of microcavities", Optics Express, vol. 12(20), pp. 4742-4750 (2004).

Del'Haye et al, "Optical frequency comb generation from a monolithic microresonator", Nature, vol. 450, pp. 1214-1217 (2007).

Gasch et al, "Multistability and soliton modes in nonlinear microwave resonators", Applied Physics Letters, vol. 44, pp. 1105-1107 (1984).

Herr et al, "Soliton mode-locking in optical microresonators", arXiv:1211.0733v1, pp. 1-10 (2012).

Holzwarth et al, "Optical frequency synthesizer for precision spectroscopy", Physical Review Letters, vol. 85(11), pp. 2264-2267 (2000).

Kippenberg et al, "Microresonator-based optical frequency combs", Science, vol. 332, pp. 555-559 (2011).

Knight et al, "Phase-matched excitation of whispering-gallery-mode resonances by a fiber taper", Optics Letters, vol. 22(15), pp. 1129-1131 (1997).

Leo et al, "Temporal cavity solitons in one-dimensional Kerr media as bits in an all-optical buffer", Nature Photonics, vol. 4, pp. 471-476 (2010).

Matsko et al, "Mode-locked Kerr frequency combs", Optics Letters, vol. 36(15) pp. 2845-2847 (2011).

Saha et al, "Modelocking and femtosecond pulse generation in chip-based frequency combs", Optics Express, vol. 21(1), pp. 1335-1343 (2013).

* cited by examiner

GENERATING OPTICAL PULSES VIA A SOLITON STATE OF AN OPTICAL MICRORESONATOR

FIELD OF THE INVENTION

The present invention relates to a light pulse source, which is adapted for generating repetitive optical pulses using an optical microresonator which is made of a resonator material with a third order (Kerr) nonlinearity and an anomalous resonator dispersion. Furthermore, the present invention relates to a method of generating repetitive optical pulses with an optical microresonator. Applications of the invention are available e. g. in metrology, in particular with compact optical clocks, telecommunications, optical information processing, information transmission, astronomy, medical diagnostics and treatment and spectroscopy.

BACKGROUND OF THE INVENTION

The discovery of passive mode-locking via saturable absorbers has led to optical femto-second pulses with applications ranging from eye-surgery to the analysis of chemical reactions on ultra-short timescales. In the frequency domain, a train of such optical pulses corresponds to a frequency comb (equidistant optical laser lines spaced by the pulse repetition rate, see e. g. R. Holzwarth et al. in "Physical Review Letters" vol. 85, 2000, p. 2264-2267), and they find use e. g. in precision spectroscopy and optical frequency metrology.

Not relying on mode-locking, frequency combs can also be generated in continuously driven, high-quality-factor Kerr-nonlinear optical microresonators (see e. g. T. J. Kippenberg et al. in "Science" vol. 332, 2011, p. 555-559).

Frequency comb generation in optical microresonators is achieved via cascaded-four-wave mixing (FWM) mediated by the Kerr-nonlinearity of the resonator material. A continuous-wave (CW) pump laser is converted into equally spaced optical modes, where the mode spacing corresponds to the freespectral range (FSR), or equivalently, the inverse resonator roundtrip time $1/T_R$. Various materials and geometries of optical microresonators, in particular optical microresonators with fully planar CMOS compatible design, are available and advances have been made with the demonstration of octave spanning spectra, phase stabilization, low phase noise microwave generation, and arbitrary optical waveform generation.

Nevertheless, the conventional generation of frequency combs still suffers from the following substantial problem. While the four-wave mixing process results in coupled phase relations between all the optical modes and correspondingly in the generation of a periodic time domain output, this however does not correspond intrinsically to pulses. Pulse shaped waveforms in time domain have been mentioned as a potential output of a conventional optical microresonator (see EP 1 988 425 A1). However, a mode-locking mechanism has not been disclosed in EP 1 988 425 A1, and the frequency combs conventionally created with practical resonators typically do not have a pulse shape.

Mode-locking, i.e. full phase synchronization inside the microresonators would solve the above problem. Moreover, mode-locking would provide a way to achieve low-noise frequency comb spectra, with little line-to-line power variation and without spectral gaps—a goal difficult to reach in systems with mode-spacings below 100 GHz, where multiple, inconsistent subcombs may form. While mode-locking has been considered possible for microresonators (A. Matsko et al., Optics Letters 36, 15, 2845-2847, 2011), a mode-locking mechanism for optical microresonators has not yet been shown. Introducing a saturable absorber or an equivalent optical element into the laser cavity, easily possible in conventional laser systems, would impair the optical quality factor Q of the microresonator. Approaches with other mode-locking mechanisms based on self-focusing or small saturable components of material absorption were not successful.

A. Gasch et al. (in "Applied Physics Letters" vol. 44, 1984, p. 1105-1107) have described soliton modes in nonlinear microwave resonators. It has also been proposed that Kerr-cavity solitons may form in optical microresonators (see F. Leo et al. in "Nature Photonics" vol. 4(7), 2010, p. 471-476). This soliton formation could lead to mode-locking. However, to date no definitive proof nor practical mechanism of optical mode locking has been identified.

OBJECTIVE OF THE INVENTION

The objective of the invention is to provide a light pulse source, which is capable of avoiding limitations of conventional techniques for generating frequency combs with optical microresonators. In particular, the light pulse source is to be capable of generating a train of optical pulses with an optical microresonator having a Kerr nonlinearity with reduced noise in frequency comb spectra, reduced power-variations between adjacent frequency components and without spectral gaps. It is a further objective of the invention to provide an improved method of generating repetitive optical pulses, wherein limitations of the conventional techniques are avoided.

SUMMARY OF THE INVENTION

These objectives are solved with a light pulse source and a method comprising the features of the independent claims, respectively. Advantageous embodiments and applications of the invention are defined in the dependent claims.

According to a first general aspect of the invention, the above objective is solved by a light pulse source for generating repetitive optical pulses, which comprises a continuous wave (cw) laser being arranged for providing cw laser light, and an optical microresonator being made of a resonator material, which has a third order (Kerr) nonlinearity and an anomalous resonator dispersion, wherein the cw laser is arranged for coupling the cw laser light into the optical microresonator.

The inventors have found that a stable soliton state of the optical microresonator, which implies optical pulses, practically can been achieved if the thermal behavior of the optical microresonator is taken into consideration. In particular, the inventors have found that an adjustment of resonant frequencies of the optical microresonator at which one or multiple soliton state(s) are achieved requires a certain temporal tuning sequence, which depends on thermal time constants of the optical microresonator. The thermal time constants are a characteristic describing the temperature change rate of the resonator during coupling optical power into the resonator. The thermal time constants are determined by the light absorption properties of the resonator, the heat capacity and heat conduction of the resonator, the heat conduction to the surrounding thereof, the profiles of optical modes in the resonator and the optical quality thereof.

Therefore, the light pulse source according to the invention comprises a tuning device, which is arranged for creating and maintaining a relative detuning of the cw laser and the optical microresonator with a predetermined tuning time profile (time dependency of relative detuning). The relative (mutual)

detuning of the cw laser and the optical microresonator means that there is a frequency spacing between the cw laser light wavelength (light frequency) and the effective resonant frequency of the current resonator mode of the optical microresonator. With a finite line shape of the cw laser light, the relative detuning determines the intensity of the cw laser light currently coupled into the optical microresonator. The effective resonance frequency of the current resonator mode depends on the size of the resonator and its effective refractive index. The temperature of the resonator affects the size of the resonator via thermal expansion and also affects the refractive index of the resonator. The coupled light power affects the effective refractive index of the resonator via the Kerr-nonlinearity and lead to a change in resonator temperature via absorption of light. The inventors have found that in a soliton state the coupled power is a well-defined quantity and therefore the soliton state requires a certain well-defined relative detuning that depends on the thermal and non-linear properties of the resonator. The inventors have found that a transition of the microresonator system to a soliton state typically coincides with a change in coupled power, which affects the temperature and thereby the effective resonance frequency. The change in effective resonance frequency implies a change in the relative detuning, which then could destabilize the soliton state.

Therefore, according to the invention, the tuning time profile is selected in dependency on the thermal time constants of the optical microresonator such that the soliton state is achieved in a thermal equilibrium state of the optical microresonator. In particular, the tuning time profile is selected such that the optical microresonator has a constant temperature in the soliton state thereof, which enables long-term table operation in a soliton state.

According to a second general aspect of the invention, the above objective is solved by a method of generating repetitive optical pulses, comprising the steps of coupling cw laser light generated with a cw laser into an optical microresonator being made of a resonator material, which has a third order (Kerr) nonlinearity and an anomalous resonator dispersion, wherein the optical microresonator, at a predetermined relative detuning of the cw laser and the optical microresonator, is capable of including a light field in a soliton state. According to the invention, the predetermined relative detuning is created and maintained with a tuning device based on a tuning time profile, which is selected in dependency on the thermal time constants of the optical microresonator such that the soliton state is achieved in a thermal equilibrium state of the optical microresonator. The soliton shaped pulses are coupled out of the optical microresonator, thus providing the repetitive optical pulses. Preferably, the method of the invention is implemented with the light pulse source according to the above first aspect of the invention.

The tuning time profile has various phases including a first temporal phase, wherein the relative detuning is changed with a predetermined detuning speed (which may change magnitude and direction), and at least one second temporal phase, wherein the relative detuning is kept constant. In particular, the detuning speed is selected in dependency on the thermal time constant. According to preferred embodiments of the invention, the first temporal phase is characterized by a large detuning speed. Preferably, the optical microresonator approaches the soliton state within a tuning period below 100 ms, preferably below 10 ms.

Advantageously, passive mode-locking in an optical microresonator is achieved without a saturable absorber, but via soliton formation supported by the balance between anomalous resonator dispersion and Kerr-nonlinearity induced self-phase modulation. This enables operation in wavelength regimes where broadband laser gain media or broadband saturable absorbers are not available. The transitions to and optionally between different soliton states manifest themselves as discrete steps in the resonator transmission of the optical microresonator influencing the temperature thereof. The inventors have described the soliton state of the optical microresonator by numerical modeling of the nonlinear coupled mode equations and an analytical description thereof. Furthermore, experimentally, the inventors have observed the generation of a train of optical pulses, e. g. pulses with 200 fs duration. Advantageously, the invention enables ultra-short pulse generation for widespread applications. Equally important low noise and low line-to-line power variation comb spectra have been achieved via single soliton states. These spectra bring microresonator combs decisively closer to frequency domain applications such as channel generators in advanced telecommunication or in fundamental studies such as astrophysical spectrometer calibration. In the time domain the invention provides a compact femto-second source, where the broadband parametric gain in principle allows for sub-cycle pulses. Moreover, femto-second pulses in conjunction with external broadening provide a viable route to microresonator radiofrequency-to-optical links.

The optical microresonator is a compact, mirror-free resonator accommodating a circulating light field, preferably a whispering gallery mode (WGM) resonator or waveguide resonator, such as a microdisc, microsphere, microtoroid or microring. The mode-field diameter of a propagating light field mode in the resonator preferably is in a range of 1 to 10 μm. The optical microresonator has a length in circumference selected in the μm to cm range. The optical microresonator is capable of including the light field in a soliton state at a plurality of resonant frequencies thereof, which correspond to the frequency components of the soliton shaped pulses. Furthermore, the soliton shaped pulses can be coupled out of the optical microresonator, which provide the repetitive optical pulses. With preferred examples, the optical microresonator is made from a polished circular preform, in particular crystalline materials such as quartz, $MgF_2$, $CaF_2$ or $BaF_2$, or fused silica SiO supporting whispering gallery optical modes, or it is made from materials suitable for micro-fabrication, in particular SiN, AlN, SiO, or Si.

According to a first embodiment of the invention, the tuning time profile can be designed in dependency on an operating state of the optical microresonator. According to a second embodiment of the invention, a preset tuning time profile can be used for adjusting the light pulse source. These two basic embodiments are described with further details in the following.

With the first embodiment of the invention, the light pulse source comprises a monitoring device, which is arranged for sensing a resonator output created in response to coupling the cw laser light into the optical microresonator. In particular, the monitoring device is capable of detecting the soliton state of the optical microresonator. The monitoring device and the tuning device are coupled with each other. The tuning device is configured for adjusting the tuning time profile, in particular the detuning speed and the duration of the first temporal phase of the tuning step, in dependency on an output signal of the monitoring device.

Advantageously, various implementations of the monitoring device are available which can be selected and/or combined in dependency on the particular application of the invention. According to a first variant, the monitoring device comprises a transmission detector, which is arranged for a detection of a discontinuous step in a resonator transmission when the soliton state of the optical microresonator is achieved. According to a second variant, the monitoring device comprises an amplitude noise detector being arranged for a detection of an amplitude noise of a resonator output. When the soliton state is achieved, the amplitude noise is essentially reduced. According to a third variant, the monitoring device comprises an RF beatnote detector being arranged for a detection of RF beatnotes between adjacent frequency components of the optical spectrum of the light field coupled out of the optical microresonator, in particular of the repetitive optical pulses. Finally, according to a fourth variant, the monitoring device comprises an intensity detector being arranged for the detection of a generated light frequency different from the frequency of the cw laser.

According to a particularly preferred embodiment of the invention, the monitoring device and the tuning device are coupled with each other so that the tuning device can be controlled in response to detecting the soliton state of the optical microresonator by the monitoring device. With this embodiment, the inventive light pulse source includes a control loop for setting and maintaining the soliton state of the optical microresonator. Advantageously, the soliton state can be achieved with high reliability even under changing operation conditions of the light pulse source. When the soliton state is achieved, the tuning device switches from the first temporal phase, wherein the relative detuning is changed, to the second temporal phase, wherein the relative detuning is maintained.

According to the second embodiment of the invention, a preset tuning time profile can be used for adjusting the light pulse source. The preset tuning time profile can be estimated on the basis of numerical simulations of the thermal time constant of and/or test procedures with the optical microresonator used. Preferably, the tuning time profile comprises a pre-stored scan time pattern, which is stored e. g. in the tuning device or another component of the light pulse source.

According to the further preferred implementation of the invention, the tuning device can be adapted for stopping the tuning or reversing the tuning direction and then stopping the tuning time profile when the soliton state of the optical microresonator is achieved. Additionally or alternatively, the tuning device can be adapted for repeatedly creating the predetermined relative detuning of the cw laser and the optical microresonator with changing tuning time profiles, until a soliton state of the optical microresonator is reached, e. g. until a certain soliton state or multiple different soliton states of the optical microresonator is/are achieved.

As a further advantage of the invention, multiple variants of providing the relative detuning of the cw laser and the optical microresonator are available. According to a preferred example, the wavelength of the cw laser is changed with a wavelength tuning device for providing the predetermined tuning time profile. With the following further mechanisms, the intensity of the light field coupled into the optical microresonator can be controlled as with the wavelength tuning. Thus, alternatively or additionally, an intensity of the cw laser light can be changed with an intensity tuning device.

With the intensity tuning device both, the resonator temperature and the Kerr-nonlinear resonance shift can be affected. Preferably, the tuning device is configured for changing an intensity and wavelength of the cw laser light simultaneously in a coordinated fashion. Furthermore, a coupling efficiency of coupling the cw laser light into the optical microresonator can be changed with a coupling tuning device, e. g. a drive unit changing a distance between a wave guide and the optical microresonator. Furthermore, at least one of a mechanical strain and a geometrical extend of the optical microresonator can be changed with a strain tuning device, and/or a temperature of the optical microresonator can be changed by at least one of laser induced heating and electrical resistor heating.

Preferably, the inventive light pulse source comprises an input waveguide being arranged for coupling the cw laser light into the optical microresonator and/or an output waveguide being arranged for coupling the optical pulses out of the optical microresonator. The input and/or output waveguides are fixedly coupled with the optical microresonator, and they allow light coupling into and/or out of the optical microresonator based on evanescent waves. Preferably, the output waveguide is adapted for a dispersion compensation. Accordingly, keeping the temporal and phase properties of the optical pulses is improved. With a particularly preferred variant of the invention, both the input waveguide and the output waveguide comprise a common waveguide, advantageously resulting in a compact and stable structure of the light pulse source.

Advantageously, the optical microresonator and at least one of the input waveguide and the output waveguide can be formed as with a structure of an integral chip. With this embodiment of the invention, the optical microresonator and at least one of the input waveguide and the output waveguide are made on a common chip substrate and integrated using planar waveguide technology.

According to a further preferred embodiment of the invention, the light pulse source further comprises a laser pump stabilizing mechanism being adapted for stabilizing a pump power of the cw laser once the soliton state is reached. Advantageously, the laser pump stabilizing mechanism facilitates a stable light pulse source duration along practical time ranges.

Preferably, the laser pump stabilizing mechanism is adapted for stabilizing and/or controlling the pump power and/or the pump frequency of the cw laser once the soliton state is reached. To this end, the intensity of the cw laser or an RF beatnote frequency measured by the monitoring device is used for controlling the cw laser. Alternatively, a separate detector device can be used for measuring the intensity before coupling the light to the resonator. Using the separate detector device has advantages in terms of providing an out of loop measurement.

According to a further advantageous embodiment of the invention, the tuning device is capable of rapidly modulating at least one of the intensity and frequency of the cw laser with a modulation frequency corresponding to an anticipated rate of the repetitive pulses to seed soliton states.

If the tuning device is capable of reducing the pump power of the cw laser for a time period shorter or on the order of an optical build-up time constant of the resonator to induce transitions between different soliton states, advantages for applications are obtained where the one soliton state is shaded by the multi-soliton regime.

BRIEF DESCRIPTION OF THE DRAWINGS

Further details and advantages of the invention are described in the following with reference to the attached drawings, which show in.

DESCRIPTION OF THE PREFERRED EMBODIMENTS

Preferred embodiments of the invention are described in the following with particular reference to the structure of the inventive light pulse source and in particular the features of a tuning device, which is used for achieving the soliton state of the optical microresonator. Exemplary reference is made to the use of a WGM microresonator made of an $MgF_2$ crystal. It is emphasized that the invention is not restricted to this particular type of an optical microresonator, but rather possible with other resonators being made of e.g. $CaF_2$, $BaF_2$, SiN, AlN, SiO or Si. Furthermore, exemplary reference is made to the use of a tuning device, which is adapted for wavelength and/or intensity tuning the light pulse source. The invention is not restricted to this exemplary tuning mechanism, but rather possible with other tuning mechanisms, which are capable of creating and maintaining a predetermined relative detuning between a cw laser and the optical microresonator, like e.g. coupling tuning, strain tuning and/or temperature tuning. Details of manufacturing the optical microresonator and waveguides as well as operating e.g. a cw laser or a monitoring device are not described as far as they are known as such from conventional techniques.

Light Pulse Source

Figure 1:
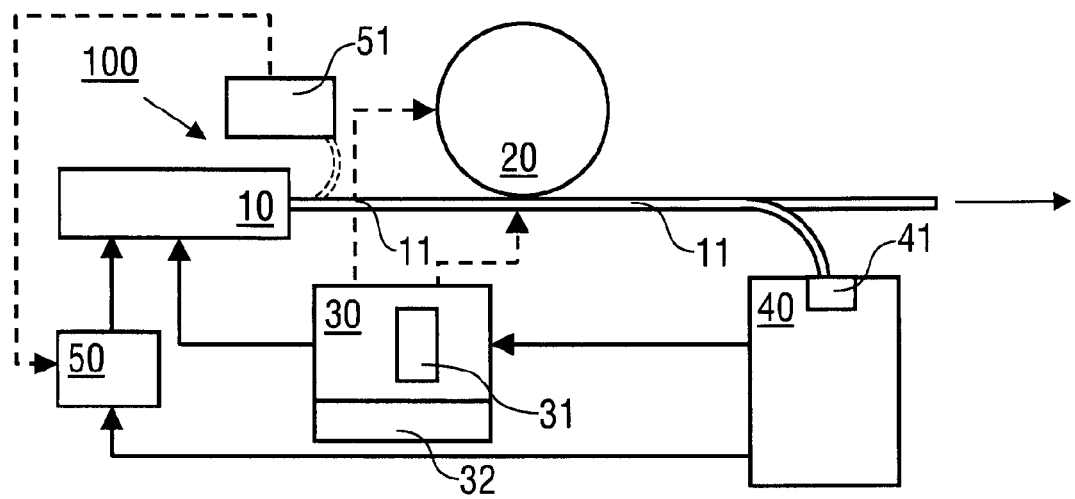
FIGS. 1 and 2: schematic illustrations of preferred embodiments of a light pulse source according to the invention.
Figure 2:
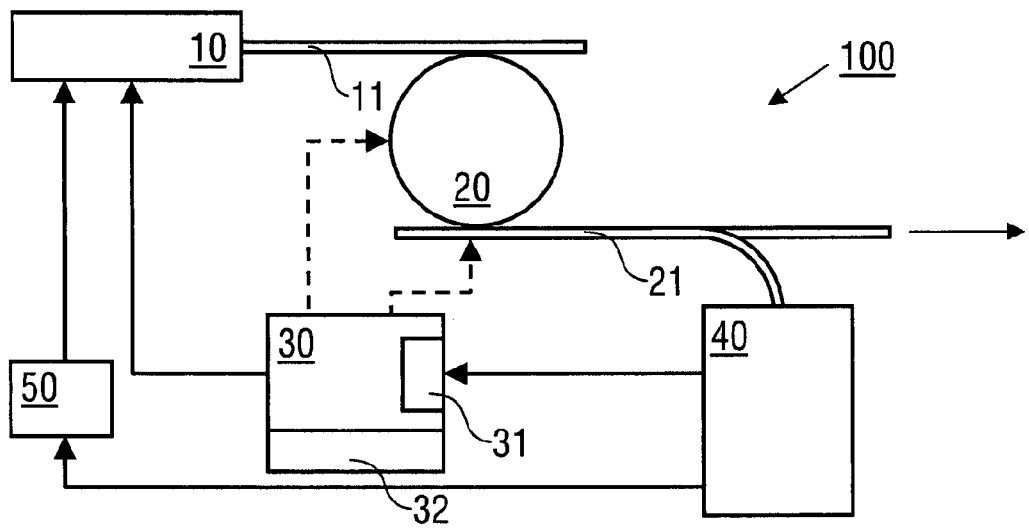

FIGS. 1 and 2 schematically illustrate two embodiments of an inventive light pulse source 100 including a continuous wave laser 10 creating cw laser light, an optical microresonator 20, a tuning device 30, a monitoring device 40 and optionally a laser pump stabilizing mechanism 50. The embodiments of FIGS. 1 and 2 differ with regard to the coupling of the cw laser light into the optical microresonator 20 and the soliton shape pulses out of the optical microresonator 20, respectively. According to FIG. 1, a common waveguide 11 is used for both incoupling the cw laser light and outcoupling the soliton shape pulses, while separate input and output waveguide 11, 21 are provided according to FIG. 2. It is noted that the implementation of the invention is not restricted to the use of waveguides, but rather possible with other coupling mechanisms. As an example, cw laser light can be coupled from a free space laser beam directly into the optical microresonator 20 using a prism.

With a practical example, the cw laser 10 comprises a fiber laser amplified by an erbium doped fiber amplifier (EDFA, not shown). The cw laser 10 is emitting cw laser light having a narrow line width (<100 kHz) and a wavelength, which can be tuned around 1553 nm. The cw laser 10 is connected with the input waveguide 11 comprising an optical fiber. Evanescent coupling of the input waveguide 11 and output waveguide 11 (or 21) and the optical microresonator 20 is achieved via a taped section of the optical fiber, e. g. as described by J. C. Knight et al. in "Optics Letters" vol. 22, 1997, p. 1129-1131.

The optical microresonator 20 comprises a rotational symmetric $MgF_2$ crystal WGM microresonator having a diameter of about 2 mm and a high-Q resonance (Q=400 million, freespectral range FSR=35.2 GHz). The optical microresonator 20 is adapted for propagating a light-field along the circumference L of the resonator (e.g. L=6.3 mm) and a round trip time $T_R$ (e.g. $T_R$=28.4 ps). The mode-field diameter is approximately 10 μm. The $MgF_2$ crystal has anomalous dispersion, and it exhibits the Kerr-effect leading to a frequency (wavelength) $\omega$ ($\lambda$) dependent and intensity I dependent effective refractive index $n_{eff}$. The optical microresonator 20 is capable of frequency comb generation via four-wave-mixing, e. g. as described by P. Del'Haye et al. in "Nature" vol. 450, 2007, p. 1214-1217 and in EP 1 988 425 A1. The optical lines generated by four-wave-mixing are supported by resonances of the microresonator cavity. If the relative phases of the lines are constant but random as it is achieved with the prior art techniques, the resulting intensity is periodic with $T_R$. If, according to the invention, the phases are synchronized via mode-locking, the resulting intensity is pulsed with a pulse repetition rate of $1/T_R$ as described below with reference to FIGS. 4 to 7.

The tuning device 30 generally is a hardware unit, which is capable of creating and maintaining a predetermined relative detuning of the cw laser 10 and the optical microresonator 20. In other words, the tuning device 30 is capable of adjusting at least one of the cw laser 10 and the optical microresonator 20. The particular implementation of the tuning device 30 depends on the tuning mechanism used. For providing a wavelength tuning, the tuning device 30 includes a drive unit for changing the resonance wavelength of the cw laser 10, e. g. for changing a strain of a fiber laser (schematically represented by the solid arrow from 30 to 10 in FIGS. 1 and 2. With further examples, the tuning 30 may compromise a drive unit for a changing a strain and/or a heating device for changing a temperature of the optical microresonator 20 and/or a drive unit for changing the coupling between the waveguide 11 and the optical microresonator 20 (represented by the dashed arrows in FIGS. 1 and 2).

Furthermore, the tuning device 30 includes an adjustment unit 31 providing the tuning time profile for implementing the adjustment of the cw laser 10 and/or the optical microresonator 20. The tuning time profile is adjusted in dependency on a current operation state of the light pulse source as measured with the monitoring device and/or a scan time pattern, which is pre-stored e. g. in a memory unit 32 of the tuning device 30.

The monitoring device 40 includes a detector unit 41, which is optically coupled with the output waveguide 11 or 21, resp.. The detector unit 41 includes at least one of an intensity detector, like e.g. a photodiode, and a detector for spectrally resolved light sensing. Furthermore, the monitoring device can include an optical spectrum analyzer and electrical spectrum analyzer for monitoring beatnotes in the detected signals (see below). Furthermore, the monitoring device 40 can include optical components, like a filter arranged between the output waveguide 21 and the detector unit 41. The filter, which comprises e.g. a fiber-bragg grating, can be arranged for blocking the cw light.

An output signal of the monitoring device 40 can be supplied to the tuning device 30. The output signal, which characterizes the current operating state of the light pulse source 100, can be used as a control signal for setting the tuning time profile of the tuning device 30.

The laser pump stabilizing mechanism 50 comprises a control loop, which is capable of stabilizing and/or controlling the output power and/or frequency (wavelength) of the cw laser 10 in order to stabilize the soliton state. The control loop of the stabilizing mechanism 50 is structured as it is known from conventional laser devices. When the soliton state of the optical microresonator 20 has been reached, as detected by the monitoring device 40, the stabilizing mechanism 50 maintains the current output power and/or frequency of the cw laser and/or controls the pump power and/or frequency in order to stabilizes the RF beatnote frequency. Alternatively, the laser pump stabilizing mechanism 50 stabilizes the power frequency of the cw laser 10 using a cw laser output intensity measured by a separate detector device 51, e. g. a photodiode, as illustrated with dashed lines in FIG. 1.

The light pulse source 100 of FIGS. 1 and 2 can be structured with separate optical components, e.g. on a stable support, like an optical board, or as an integral chip component. In particular, the input and output waveguides 11, 21 and the optical microresonator 20 can be formed by planar waveguide technology on a common chip substrate, made of e.g. Si. The cw laser 10 can be manufactured on the substrate as well, or it can be provided as a separate component.

Figure 3:
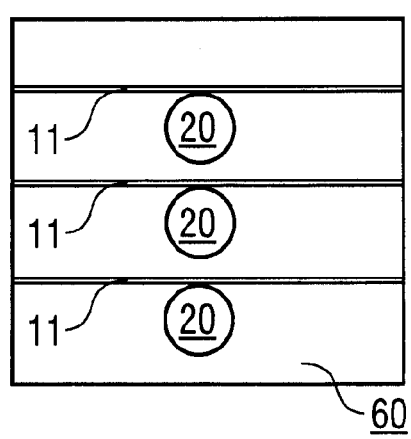
FIG. 3: a schematic plan view of a further embodiment, wherein an inventive light pulse source includes multiple optical microresonators.

The provision of the light pulse source 100 as an integral chip has advantages in terms of minimizing the device dimensions and stabilizing the device operation. In particular, with applications in signal processing and telecommunications, multiple optical microresonators 20 can be integrated on the common chip substrate 60, as it is schematically illustrated with the plan view of FIG. 3. The chip substrate 60 carries two or more input and output waveguides 11 and associated optical microresonators 20. As an example, the chip substrate 60 of FIG. 3 has dimensions of 5*5 mm and a thickness of 1 mm. The remaining components of the light pulse source 100, as shown e.g. in FIGS. 1 and 2, can be provided as separate components, which are optically coupled with the substrate chip 60.

Generating Optical Pulses

The adaptive laser tuning scheme used according to the invention is described in the following with reference to practical implementations and experimental results illustrated in FIGS. 4 to 6. These results have been obtained with an experimental setup composed of the inventive light pulse source (including laser source 10 and optical microresonator 20, see FIG. 1 or 2), where the output waveguide is coupled to an optical spectrum analyzer with two photodiodes and analyzer setup for Fourier resolved optical gating (FROG) to characterize the pulses. The optical spectrum analyzer records the optical spectrum in a soliton state. One photodiode is used to detect the intensity transmission signal, the other photodiode is used to detect the converted light intensity (the pump cw laser light is filtered out by a narrow fiber-Bragg grating in transmission), i.e. the light in the frequency components different from the pump laser as well as the RF beatnote contained in the converted light intensity signal. The signal from the second photodiode is split into its DC and high frequency parts, which correspond to the converted light intensity and RF beat note at 35.2 GHz respectively. The high frequency part is downmixed to 20 MHz using the third harmonic of a local oscillator at 11.7 GHz. All photodiode signals are sampled using an oscilloscope. The sampled trace of the downmixed beatnote is Fourier-transformed to obtain the RF spectrum of the RF beatnote.

With changing a detuning between the cw laser 10 and the optical microresonator 20 over time, the centre wavelength (or frequency $\omega_p$) of the cw laser 10 is shifted towards resonance frequencies of the soliton state of the optical microresonator 20. The relative detuning determines the intensity of the cw laser light currently coupled into the optical microresonator. Accordingly, the effect of detuning can be measured by sensing the transmission of the optical microresonator 20. As an example, FIG. 4 illustrates the transmission (curve A) of the optical microresonator observed when scanning a laser (coupled pump power 5 mW) over a high-Q Kerr-non-linear resonance in a $MgF_2$ resonator.

When scanning the pump laser over the resonance, the transmission signal (curve A) decreases due to increasing power coupled into the resonator. The increase of intra-cavity power also results in a shift of resonance frequency towards lower frequencies via a combined effect of thermal expansion, thermal refractive index change and Kerr-effect. This leads to a non-Lorentzian, triangular resonance shape when the pump laser is tuned with decreasing optical frequency over the resonance. Furthermore, reducing the laser-cavity detuning leads to a build-up of intra-cavity power, and once a critical power threshold is reached, the pump light is converted into new frequency components. First, widely spaced primary comb modes are generated, followed by secondary modes filling in the spectral gaps resulting in discrete changes of the intensity coupled into the resonator until the soliton state of the resonator is reached. The combined intensity in the generated mode is shown as curve B in FIG. 4. When the transition to a soliton state occurs (point C in FIG. 4) the transmission and the converted light intensity show discontinuous change. Typically more than one soliton transition can be observed (following the first transition at point) C in the form of discrete steps (right portion of FIG. 4). A similar series of discrete steps has been observed in a non-linear microwave resonator, and connected to soliton formation (see A. Gasch et al. in "Applied Physics Letters" vol. 44, 1984, p. 1105-1107). These observations indicate the mode-locking which is reached in the optical microresonator and are further supported by the simultaneous measurement of the RF beat-note (as described above) shown in FIG. 5.

Figure 4:
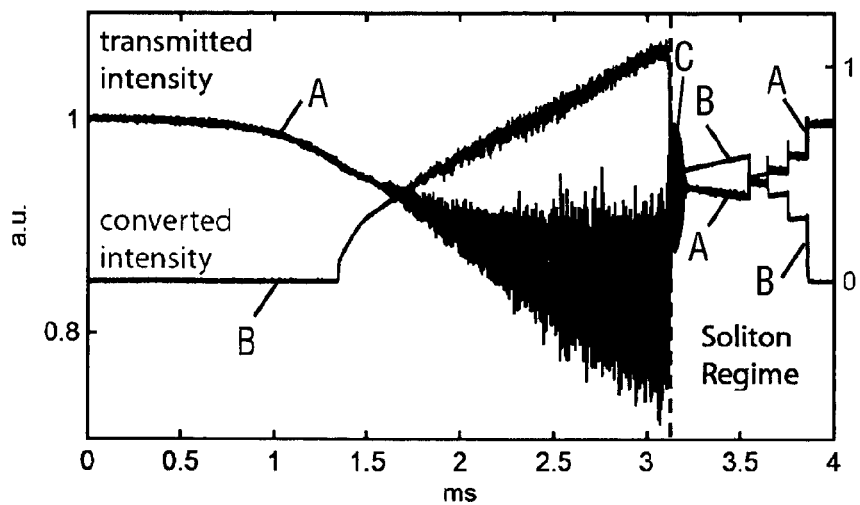
FIGS. 4 to 6: schematic diagrams illustrating the selection of a tuning time profile according to preferred embodiments of the inventive method for generating optical pulses.
Figure 5:
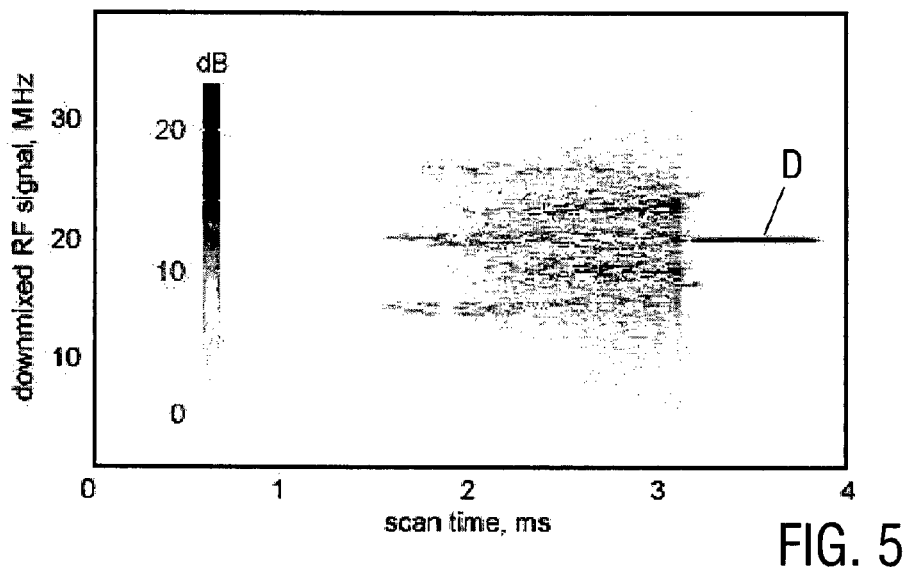

FIG. 5 illustrates that the state of the microresonator can be monitored by measuring a radiofrequency beat signal created by the output signal of the resonator. The Fourier-transformed, sampled beat signal as contained in FIG. 5 shows a transition from a broad, noisy RF signal to a single, low-noise RF beat note (see signal D). This transition coincides with the beginning of the series of discrete steps in the transmission (FIG. 4), which deviate markedly from the expected thermal triangle. The single, low-noise RF beat note indicates the generation of repetitive optical pulses coupled out of the resonator.

As shown in FIG. 4, the transmission of the resonator is increased and the power in the resonator is decreased when the system undergoes the transition to a soliton state. Accordingly, the soliton state of the resonator is a state of low resonator power and correspondingly lower resonator temperature compared with the previous first temporal phase. As the resonance frequencies of the resonator are shifted in a first direction (towards lower frequencies) with increasing temperature in the first temporal phase, followed by a backshift (towards higher frequencies) in the second temporal phase, a temperature instability of the resonator occurs. With the teaching of the invention, stable soliton states of the resonator and self-locking of the resonator cavity have been obtained despite of this instability as further discussed in the following.

As an important result of the present invention, the discrete transmission steps are only readily observed transiently when the detuning is provided with a predetermined tuning time profile, in particular if scanning the pump laser is sufficiently quick (e. g. within a few milliseconds) over the resonance such that thermal effects are small. The inventors have found that the obstacle in reaching stable mode-locked states experimentally in the resonator lies in the absorption induced thermal shift of the resonance frequency. This implies that a stable effective laser cavity detuning (as required for stable comb operation) is only reached close to thermal equilibrium, where the laser and cavity can remain at relative detuning that is stable against small thermal or light intensity fluctuations (the principle of this stability is described by T. Carmon et al. in "Optics Express" vol. 12, 2004, p. 4742-4750). If the transmission during comb evolution would follow the regular thermal triangle only this could be achieved by slowly (adiabatically) tuning the laser frequency transitioning between different comb states. However, adiabatic laser tuning does not generally allow reaching microresonator states preceded by the discrete transmission steps. In this case, the transmission (and therefore the intracavity power) undergoes sudden changes, inducing a rapid change of resonance frequency destabilizing the respective comb state.

To avoid this laser detuning instability, the adaptive laser tuning scheme has been proposed with the invention, whereby the laser is scanned quickly to the equilibrium position of the respective targeted mode-locked state. The laser scan speed, or generally the tuning time profile of detuning, is chosen such that the resulting temperature at the targeted position is equal to the equilibrium temperature as schematically illustrated in FIG. 6.

Figure 6:
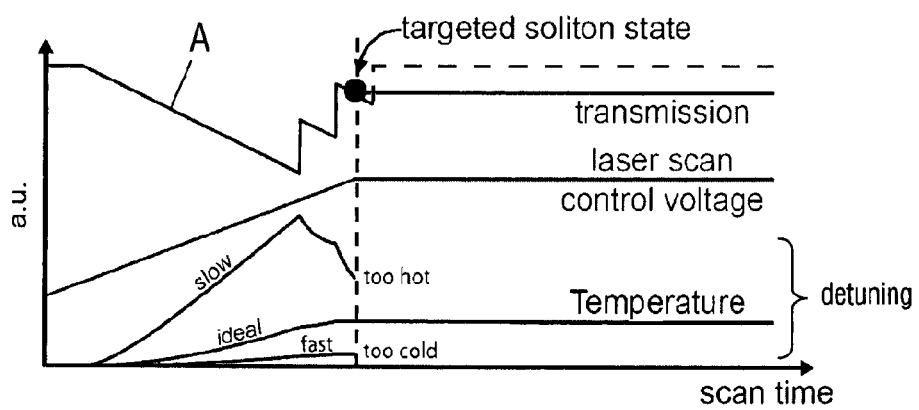
Figure 7:
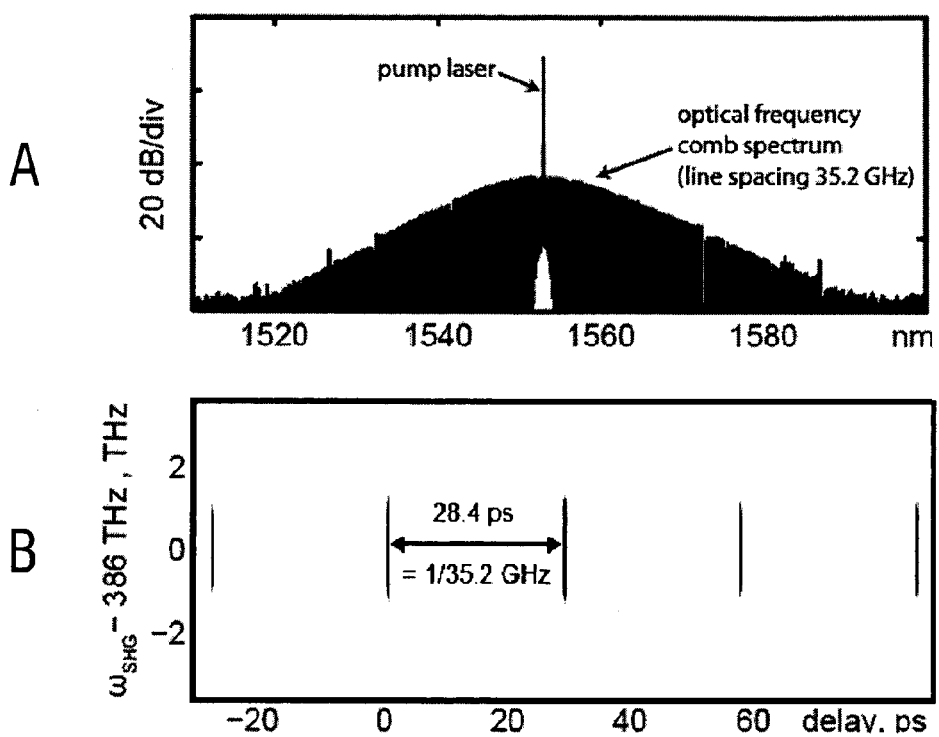
FIG. 7A-7D: experimental results illustrating further features of the inventive method of generating optical pulses and the creation of soliton states of an optical microresonator.
Figure 7:
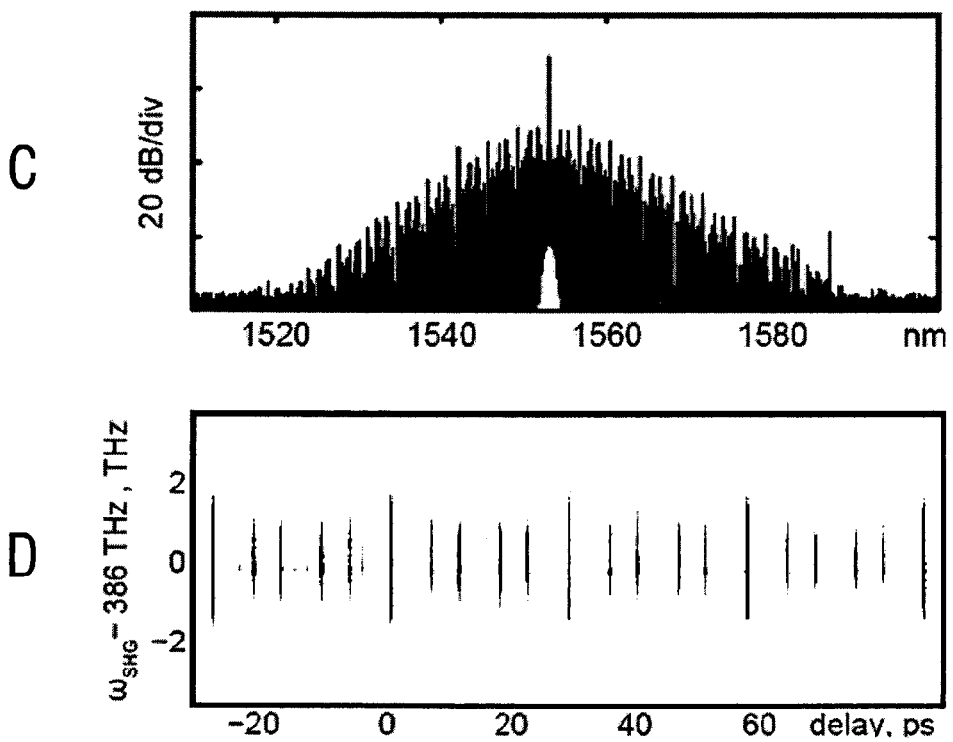

The upper curve A in FIG. 6 shows the resonator transmission with the discrete step when reaching the soliton state as in FIG. 4. The three lower curves show simulation results representing the temperature of the resonator during detuning. Reducing the scan speed (detuning slow) causes the transmission steps to become less visible, eventually resulting in a single vertical jump to unity transmission. In this case, if detuning is too slow, the resonator temperature is too high for achieving a stable soliton state. On the other hand, with fast detuning speed, there is not sufficient time for the resonator to heat up, so that the resonator temperature is too low for reaching a stable soliton state. With an optimum tuning time profile, in particular detuning speed, a constant resonator temperature is obtained after reaching the resonance. When the resonator temperature is maintained, the detuning is kept constant as represented by the laser scan control voltage curve in FIG. 6.

In practical implementations of the invention, the detuning speed can be selected based on numerical simulations. The numerical simulations can be based on a coupled mode-equations approach as known in the field of microresonator combs and an estimation of the thermal time constant of the optical microresonator. However, it is not necessary that the thermal time constant is estimated. Thus, with alternative implementations of the invention, the detuning speed can be selected based on reference data or test experiments. In particular, the detuning can be repeated with slightly changing parameters, e. g. detuning speed and power of cw laser light, for obtaining an iterative scan profile, until the detuning towards the thermal equilibrium of the resonator is obtained. Even with e. g. 1000 repetitions, the optimum tuning time profile is obtained within some seconds. Furthermore, the soliton-states may also be reached by stabilizing the relative laser to cavity detuning via thermal (such as laser power variation) or mechanical actuation on the cavity resonance frequency or via injection locking.

Alternatively, the detuning can be controlled with a control loop using the monitoring device 40 and the tuning device 30 as shown in FIGS. 1 and 2. The output signal of the monitoring device 40 that characterizes the current operating state of the light pulse source 100 is supplied to the tuning device 30. The tuning time profile of the tuning device 30, e. g. the detuning speed, is set in dependency on the control signal. When the control signal indicates that the a stable soliton state cannot be achieved, the detuning speed is changed. When the control signal indicates that measured stable soliton state is achieved, the tuning is completed and the current relative detuning is kept constant.

FIG. 7A-7D shows experimental results showing the optical spectra and proving the generation of optical pulses. Moreover, the results show that the invention also can be used for generating different soliton states of the resonator. According to FIGS. 7A and 7B, a stable single soliton state is measured with the optical spectrum analyzer and the FROG method, resp.. The FROG method, which essentially is a spectrally resolved autocorrelation measurement, allows determining the pulse duration and the pulse repetition rate. Alternatively, another stable soliton state can be obtained, which supports five solitons as shown in FIGS. 7C and 7D.

The features of the invention disclosed in the above description, the figures and the claims can be equally significant for realising the invention in its different embodiments, either individually or in combination.

The invention claimed is:

1. A light pulse source adapted for generating repetitive optical pulses, comprising:
   a continuous wave (cw) laser arranged for providing cw laser light,
   an optical microresonator comprising a resonator material, which has a third order (Kerr) nonlinearity and an anomalous resonator dispersion, wherein the cw laser is arranged for coupling the cw laser light into the optical microresonator, which, at a predetermined relative detuning of the cw laser and the optical microresonator, is capable of including a light field in a soliton state, wherein soliton shaped pulses can be coupled out of the optical microresonator for providing the repetitive optical pulses, and
   a tuning device arranged for creating and maintaining the predetermined relative detuning of the cw laser and the optical microresonator based on a tuning time profile selected in dependency on a thermal time constant of the optical microresonator such that the soliton state is achieved in a thermal equilibrium state of the optical microresonator.

2. The light pulse source according to claim 1, further comprising
   a monitoring device arranged for sensing a resonator output created in response to coupling the cw laser light into the optical microresonator and capable of detecting the soliton state, and
   the tuning device is adapted for adjusting the tuning time profile in dependency on an output signal of the monitoring device.

3. The light pulse source according to claim 2, wherein the monitoring device comprises at least one of
   a transmission detector arranged for a detection of a discontinuous step in a resonator transmission when reaching the soliton state of the optical microresonator,
   an amplitude noise detector arranged for a detection of an amplitude noise of a resonator output,
   an RF beatnote detector arranged for a detection of RF beatnotes between adjacent frequency components of the optical spectrum of the light field coupled out of the optical microresonator, and
   an intensity detector arranged for a detection of a generated light frequency different from the frequency of the cw laser.

4. The light pulse source according to claim 3, wherein
   the monitoring device and the tuning device are coupled with each other so that the tuning device can be controlled in response to detecting the soliton state of the optical microresonator by the monitoring device.

5. The light pulse source according to claim 1, wherein
   the tuning time profile comprises a pre-stored scan time pattern.

6. The light pulse source according to claim 1, wherein
   the tuning device is capable of reversing a tuning direction of the tuning time profile when the soliton state of the optical microresonator is achieved.

7. The light pulse source according to claim 1, wherein the tuning device is capable of repeatedly creating the predetermined relative detuning of the cw laser and the optical microresonator with changing tuning time profiles, until a soliton state of the optical microresonator is reached.

8. The light pulse source according to claim 1, wherein the tuning device comprises at least one of
a wavelength tuning device capable of changing a wavelength of the cw laser,
an intensity tuning device capable of changing an intensity of the cw laser light,
a coupling tuning device capable of changing a coupling efficiency of coupling the cw laser light into the optical microresonator,
a strain tuning device capable of changing at least one of a mechanical strain and a geometrical extend of the optical microresonator,
a temperature tuning device capable of changing a temperature of the optical microresonator by at least one of laser induced heating and electrical resistor heating, and
a wavelength and intensity simultaneous tuning device capable of changing an intensity and wavelength of the cw laser light simultaneously in a coordinated fashion.

9. The light pulse source according to claim 1, further comprising at least one of
an input waveguide arranged for coupling the cw laser light into the optical microresonator, and
an output waveguide arranged for coupling the optical pulses out of the optical microresonator.

10. The light pulse source according to claim 9, wherein the input waveguide and the output waveguide comprise a common waveguide.

11. The light pulse source according to claim 9, wherein the output waveguide is adapted for a dispersion compensation.

12. The light pulse source according to claim 9, wherein the optical microresonator and at least one of the input waveguide and the output waveguide are integrally formed in a chip.

13. The light pulse source according to claim 1, further comprising
a laser pump stabilizing/controlling mechanism arranged for at least one of stabilizing and controlling at least one of a pump power and a pump frequency of the cw laser once the soliton state is reached in order to stabilize the soliton state, wherein the stabilizing/controlling mechanism uses an intensity measured by the monitoring device or a separate detector device or uses an RF beatnote frequency measured by the monitoring device.

14. The light pulse source according to claim 1, wherein the tuning device is capable of changing the resonance frequency of the optical microresonator such that the optical microresonator approaches the soliton state within a tuning period below 100 ms.

15. The light pulse source according to claim 1, further comprising at least one of the features
the optical microresonator comprises a polished circular crystalline preform selected from the group consisting of quartz, $MgF_2$, $CaF_2$ and $BaF_2$, supporting whispering gallery optical modes, and
the optical microresonator further comprises materials suitable for micro-fabrication selected from the group consisting of SiN, AlN, SiO, and Si, whereby the optical microresonator and a waveguide are arranged on a common chip substrate.

16. The light pulse source according to claim 1, wherein the tuning device is capable of rapidly modulating at least one of the intensity and frequency of the cw laser with a modulation frequency corresponding to an anticipated rate of the repetitive pulses to seed soliton states.

17. The light pulse source according to claim 1, wherein the tuning device is capable of reducing the pump power of the cw laser for a time period shorter or on an order of an optical build-up time constant of the resonator to induce transitions between different soliton states.

18. A method of generating repetitive optical pulses, comprising the steps of:
providing cw laser light with a continuous wave (cw) laser,
coupling the cw laser light into an optical microresonator comprising a resonator material, which has a third order (Kerr) nonlinearity and an anomalous resonator dispersion, wherein the optical microresonator, at a predetermined relative detuning of the cw laser and the optical microresonator, is capable of including a light field in a soliton state,
creating and maintaining the predetermined relative detuning of the cw laser and the optical microresonator with a tuning device based on a tuning time profile selected in dependency on a thermal time constant of the optical microresonator such that the soliton state is achieved in a thermal equilibrium state of the optical microresonator, and
coupling soliton shaped pulses out of the optical microresonator, which provide the repetitive optical pulses.

19. The method according to claim 18, further comprising the steps of
sensing a resonator output created in response to coupling the cw laser light into the optical microresonator and detecting the soliton state with a monitoring device, and
adjusting the tuning time profile in dependency on an output signal of the monitoring device.

20. The method according to claim 19, wherein the monitoring device detects the soliton state by measuring at least one of
a discontinuous step in a resonator transmission when reaching the soliton state of the optical microresonator,
an amplitude noise of a resonator output,
RF beatnotes between adjacent frequency components of the optical spectrum of the repetitive optical pulses, and
a generated light frequency different from the frequency of the cw laser.

21. The method according to claim 20, further comprising the step of
controlling the tuning device in response to detecting the soliton state of the optical microresonator by the monitoring device.

22. The method according to claim 18, wherein
the tuning time profile comprises a pre-stored scan time pattern.

23. The method according to claim 18, further comprising the step of
reversing a tuning direction of the tuning time profile when the soliton state of the optical microresonator is reached.

24. The method according to claim 18, further comprising the step of
repeatedly creating the predetermined relative detuning of the cw laser and the optical microresonator with changing tuning time profiles, until a soliton state of the optical microresonator is reached.

25. The method according to claim 18, wherein the tuning device conducts at least one of
- changing a wavelength of the cw laser,
- changing an intensity of the cw laser light,
- changing a coupling efficiency of coupling the cw laser light into the optical microresonator,
- changing at least one of a mechanical strain and a geometrical extend of the optical microresonator,
- changing a temperature of the optical microresonator by at least one of laser induced heating and electrical resistor heating, and
- changing an intensity and wavelength of the cw laser light simultaneously in a coordinated fashion.

26. The method according to claim 18, further comprising at least one of the steps of
- coupling the cw laser light into the optical microresonator using an input waveguide, and
- coupling the optical pulses out of the optical microresonator using an output waveguide.

27. The method according to claim 18, further comprising at least one of the steps of
- stabilizing at least one of a pump power and a pump frequency of the cw laser once the soliton state is reached in order to stabilize the soliton state, and
- controlling at least one of a pump power and a pump frequency of the cw laser once the soliton state is reached in order to stabilize the soliton state.

28. The method according to claim 18, wherein
the optical microresonator approaches the soliton state within a tuning period below 100 ms.

29. The method according to claim 18, further comprising the step of
modulating at least one of the intensity and frequency of the cw laser with a modulation frequency corresponding to an anticipated rate of the repetitive pulses to seed soliton states.

30. The method according to claim 18, further comprising the step of
reducing the pump power of the cw laser for a time period shorter or on an order of an optical build-up time constant of the resonator to induce transitions between different soliton states.

* * * * *